UNITED STATES PATENT OFFICE.

DAVID W. LAWHON, OF ELGIN, TEXAS, ASSIGNOR OF ONE-HALF HIS RIGHT TO WILLIAM C. LAWHON.

IMPROVEMENT IN REMEDIES FOR DROPSY.

Specification forming part of Letters Patent No. 184,393, dated November 14, 1876; application filed October 12, 1875.

*To all whom it may concern:*

Be it known that I, DAVID W. LAWHON, of Elgin, in the county of Bastrop and State of Texas, have invented a certain new and useful Medical Compound; and I do hereby declare that the following is a clear and exact description of my invention, which will enable others skilled in the art to which it pertains to make and use the same.

My invention relates to that class of medical compounds that are used for the cure or alleviation of dropsy or dropsical complaints; and it consists in a mixture of the following ingredients, in about the proportions stated:

Extract of grape-vine, twenty ounces; spirits of niter, twelve drams; oil of grape-vine, four drams; extract of Spanish apple root, two drams; common salt, four drams.

The extract of grape-vine I obtain by reducing a quantity of the vine to ashes and pouring on water, after which the extract or lye thus produced is filtered and ready for use. The oil of grape-vine is obtained by tapping the vine near the root; and the extract of Spanish apple root is prepared by boiling the roots of the "Spanish apple" (a herbaceous plant indigenous to the southern States) after they have been cleaned, and straining the decoction.

I have found this compound efficient in cases of dropsy or dropsical affections through its action upon the bladder, kidneys, and urinary organs, causing frequent and copious discharges of water through the natural channels of the body.

The dose should be regulated to suit varying conditions of the case. In ordinary dropsical complaints a wine - glassfull every half hour, until it commences to operate, may be considered a proper dose for an adult.

Having thus described my invention, I claim and desire to secure by Letters Patent of the United States—

A medical compound for the cure of dropsy or dropsical complaints, consisting of extract of grape-vine, spirits of niter, oil of grape-vine, extract of Spanish apple root, and common salt, mixed in about the proportions specified.

DAVID WESLEY LAWHON.

Witnesses:
    F. A. ORGAIN,
    PHIL. CLAIBORNE.